United States Patent
Hammond et al.

[11] 3,777,156
[45] Dec. 4, 1973

[54] BENT DIFFRACTION CRYSTAL WITH GEOMETRICAL ABERRATION COMPENSATION

[75] Inventors: Donald L. Hammond, Los Altos Hills; Hugo R. Fellner, Portola Valley, both of Calif.

[73] Assignee: Hewlett-Packard Company, Palo Alto, Calif.

[22] Filed: Feb. 14, 1972

[21] Appl. No.: 225,977

[52] U.S. Cl. .............................................. 250/280
[51] Int. Cl. ........................................ G01m 23/20
[58] Field of Search .................. 250/51.5, 49.5 PE, 250/53.1, 280

[56] References Cited
UNITED STATES PATENTS

| | | | |
|---|---|---|---|
| 2,688,093 | 8/1954 | Dumond | 250/51.5 |
| 2,853,617 | 9/1958 | Berreman | 250/51.5 |
| 3,397,312 | 8/1968 | Okano | 250/51.5 |

Primary Examiner—James W. Lawrence
Assistant Examiner—B. C. Anderson
Attorney—Roland I. Griffin

[57] ABSTRACT

A spherically bent diffraction crystal employed in an X-ray monochromator is provided with a nonuniform strain distribution to compensate for a geometrical aberration produced by nonconformity of the surface of the diffraction crystal to the Rowland circle of the monochromator.

8 Claims, 10 Drawing Figures

PATENTED DEC 4 1973  3,777,156
SHEET 1 OF 4
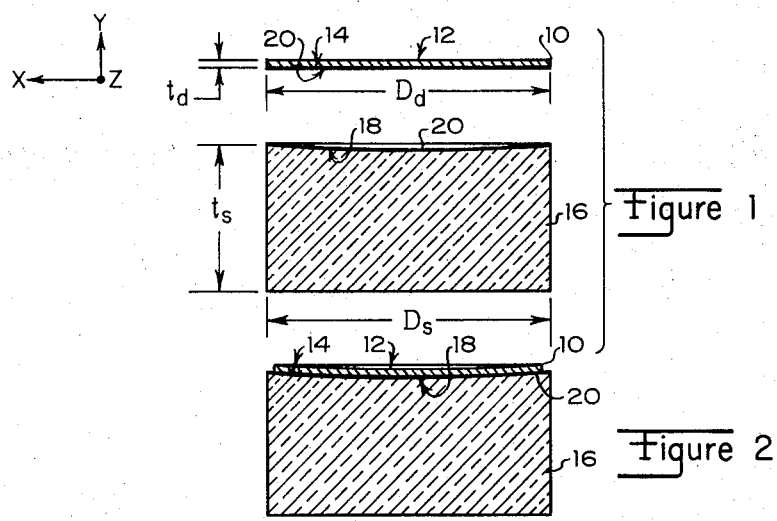
Figure 1
Figure 2
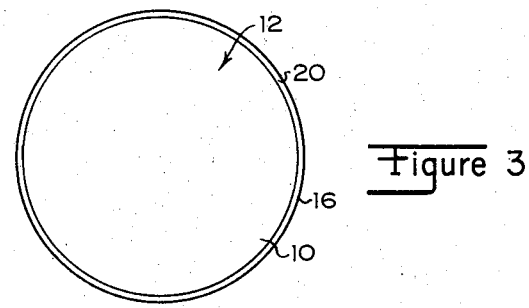
Figure 3
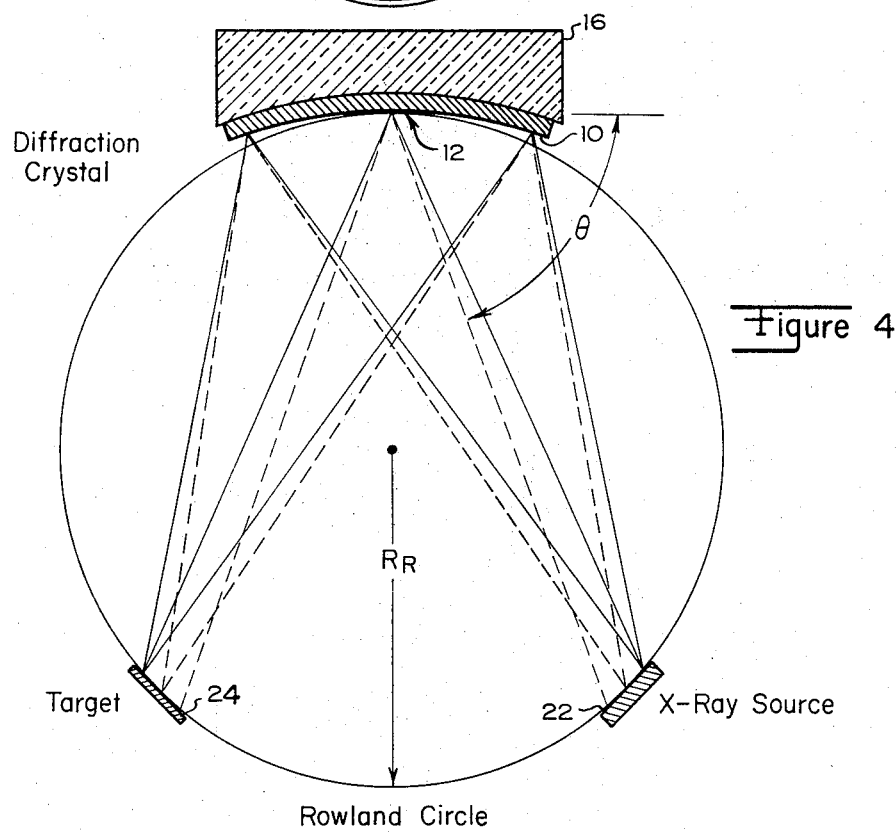
Figure 4

BENT DIFFRACTION CRYSTAL WITH GEOMETRICAL ABERRATION COMPENSATION

BACKGROUND AND SUMMARY OF THE INVENTION

This invention relates generally to X-ray monochromators of the type used in X-ray spectroscopy, in electron spectroscopy for chemical analysis (ESCA), and in other such applications requiring monochromatic X-radiation and, more particularly, to bent diffraction crystals that may be employed in such monochromators.

Ideally, an X-ray monochromator would be fabricated by employing a bent diffraction crystal, which, in the plane of the Rowland circle of the monochromator, has a curved surface with a radius of curvature equal to the radius of the Rowland circle and has curved atomic planes with a radius of curvature equal to the diameter of the Rowland circle. Such a diffraction crystal would be very difficult to make. Accordingly, an X-ray monochromator is typically fabricated by employing a cylindrically bent diffraction crystal, which, in the plane of the Rowland circle of the monochromator, has a curved surface and curved atomic planes with a radius of curvature equal to the diameter of the Rowland circle. An improved point focusing monochromator employing a spherically bent diffraction crystal, which, in the plane of the Rowland circle of the monochromator, also has a curved surface and curved atomic planes with a radius of curvature equal to the diameter of the Rowland circle is disclosed in copending U. S. Pat. Application Ser. No. 3000 entitled A CRYSTAL MONOCHROMATOR AND METHOD OF FABRICATING A DIFFRACTION CRYSTAL EMPLOYED THEREIN, filed on Jan. 15, 1970, by Hammond et al, and assigned to the same assignee as this application. In either of the two last-mentioned types of monochromator the lack of conformation of the curved surface of the bent diffraction crystal to the Rowland circle of the monochromator produces a geometrical aberration, which, in the plane of the Rowland circle of the monochromator, causes the X-rays reflected from the edge of the curved surface of the diffraction crystal to be shifted toward lower Bragg angles relative to the X-rays reflected from the center of the curved surface of the diffraction crystal. This reduces the resolution of the monochromator.

Accordingly, it is the principal object of this invention to reduce the geometrical aberration produced by the nonconformity of the surface of the bent diffraction crystal to the Rowland circle of the monochromator.

This object is accomplished according to the preferred embodiment of this invention by employing a spherically bent diffraction crystal of the type mentioned above in an X-ray monochromator and by providing this spherically bent diffraction crystal with a nonuniform strain distribution, which, in the plane of the Rowland circle of the monochromator, shifts the X-rays reflected from the center of the curved surface of the diffraction crystal toward lower Bragg angles closer or equal to those of the X-rays reflected from the edge of the curved surface of the diffraction crystal. This reduces the geometrical aberration produced by nonconformity of the curved surface of the spherically bent diffraction crystal to the Rowland circle of the monochromator and thereby increases the resolution of the monochromator.

DESCRIPTION OF THE DRAWINGS

FIGS. 1 and 2 are half-sectional elevational views showing how a spherically bent y-cut crystalline quartz diffraction crystal according to the preferred embodiment of this invention may be fabricated.

FIG. 3 is a top view of the spherically bent diffraction crystal of FIGS. 1-2.

FIG. 4 is a schematic representation of a point focusing monochromator employing the spherically bent diffraction crystal of FIGS. 1-3. This figure also illustrates how providing the spherically bent diffraction crystal with a nonuniform strain distribution compensates for the geometrical aberration produced by the nonconformity of the curved surface of the spherically bent diffraction crystal to the Rowland circle of the monochromator.

DESCRIPTION OF THE PREFERRED EMBODIMENT

Figure 5:
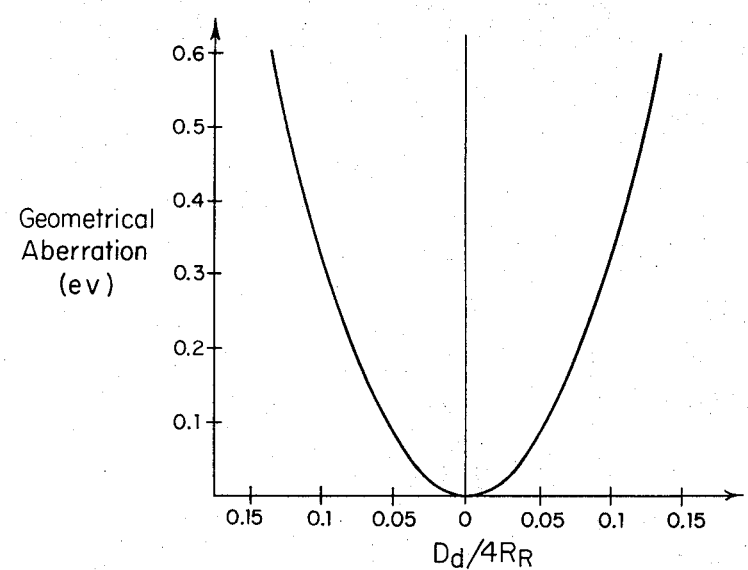
FIG. 5 is a plot of the above-mentioned geometrical aberration in electron-volts as a function of the ratio of the radius, $D_d/2$, of the spherically bent diffraction crystal of FIGS. 1-4 to the radius of curvature, $2R_R$, of the curved surface of the spherically bent diffraction crystal for Al $K\alpha$ X-rays.

A spherically bent diffraction crystal according to the preferred embodiment of this invention may be fabricated by employing the method shown and described in the copending U.S. patent application mentioned above and as above in FIGS. 1-4 of this application and described below. Referring first to FIG. 1, this is accomplished by forming a thin y-cut (01.0) crystalline quartz disc 10 having flat surfaces 12 and 14 parallel within less than a minute and preferably only a few seconds to the atomic planes of the quartz disc. The quartz disc 10 should have a diameter, $D_d$, about an order of magnitude less than the diameter, $2R_R$, of the Rowland circle (that is, it should have an $f$ number of about 10 where $f = 2R_R/D_d$). It should also have a thickness, $t_d$, of at least two orders of magnitude less than the radius, $R_R$, of the Rowland circle. For example, in the case of a Rowland circle with a desired radius, $R_R$, of 5.5 inches, a quartz disc 10 having a diameter of about 1.4 inches and a thickness of about 0.003–0.020 inch (preferably about 0.013 inch) may be employed. The quartz disc 10 may be formed by cutting it from a body of natural or synthetic crystalline quartz stock (Z growth synthetic quartz being preferred because of its greater uniformity) and lapping or otherwise grinding it to obtain the required thickness and the required parallelism between the surfaces 12 and 14 and the atomic planes of the quartz disc.

An x-cut (10.0) crystalline quartz substrate 16 having substantially the same thermal coefficient of expansion as the crystalline quartz disc 10 is formed with a spherical surface 18 having a radius of curvature substantially equal to the diameter, $2R_R$, of the Rowland circle. The quartz substrate 16 should have a diameter, $D_s$, greater than that of the quartz disc 10 and should have a thickness, $t_s$, at least an order of magnitude greater than that of the quartz disc. In the case of a Rowland circle and a quartz disc 10 with the dimensions set forth above, a quartz substrate 16 having a diameter of about 0.050–0.100 inch more than that of the quartz disc, a thickness of about ½ inch, and a spherical surface 18 with a radius of curvature of about 11 inches is preferably employed. The quartz substrate 16 may also be formed by cutting it from a body of natural or synthetic crystalline quartz stock and grinding it to obtain the required spherical surface 18.

The spherical surface 18 of quartz substrate 16 and the adjoining flat surface 14 of quartz disc 10 are plated with a brazing material 20 such as an alloy of 45 percent tin and 55 percent gold. This may be done, for example, by masking the remaining surfaces of the quartz disc 10 and the quartz substrate 16 and by vacuum depositing the brazing material 20 to a depth of about 2,000 Angstroms on the exposed surfaces 14 and 18. As indicated with the aid of FIGS. 2 and 3, the quartz disc 10 is forced against the quartz substrate 16 with the Z axes of the quartz disc and the quartz substrate aligned and with the plated lower surface 14 of the quartz disc in continuous abutment upon the plated spherical surface 18 of the quartz substrate. This may be done by aligning the Z axes of the quartz disc 10 and the quartz substrate 16 in an evacuated enclosure with the upper surface 12 of the quartz disc abutting upon one side of a resilient diaphragm and then applying gradually increasing gas pressure to the other side of the resilient diaphragm until the plated surface 14 of the quartz disc spherically bends into continuous abutment with the plated spherical surface 18 of the quartz substrate (a pressure of about 35 psi is required for a quartz disc and a quartz substrate with the dimensions set forth above). The spherically bent quartz disc 10 is brazed in place on the plated spherical surface 18 of the quartz substrate 16 by heating the quartz disc and the quartz substrate to a temperature above the melting point of the brazing material 20 but below the point of damaging the quartz. For the above-mentioned tin-gold alloy this temperature is about four hundred degrees Centigrade. Gas pressure is continuously applied through the resilient diaphragm to the upper surface 12 of the spherically bent quartz disc 10 until the melted brazing material 20 has had sufficient time to cool and solidify thereby bonding the spherically bent quartz disc in place on the plated spherical surface 18 of quartz substrate 16.

If the Z axes of the spherically bent quartz disc 10 and the quartz substrate 16 are misaligned, a stress is placed on the spherically bent quartz disc as the spherically bent quartz disc and the quartz substrate cool from the solidification temperature of the brazing material 20 down to room temperature. This stress increases with the misalignment angle of the Z axes and with the solidification temperature of the brazing material 20 and may become sufficiently large to fracture the spherically bent diffraction crystal 10. For example, in the case of the above-mentioned tin-gold alloy, a spherically bent quartz disc 10 and a quartz substrate 16 with the dimensions and structure set forth above must have their Z axes aligned within less than thirty and preferably less than twelve degrees to reliably prevent the spherically bent quartz disc from fracturing.

These steps provide a spherically bent diffraction crystal 10 with a nonuniform strain distribution and with concentric spherical surfaces and atomic layers each having a radius of curvature substantially equal to the diameter, $2R_R$, of the Rowland circle. For purposes of this specification and the claims appended hereto, a radius of curvature is considered to be substantially equal to the diameter, $2R_R$, of the Rowland circle if it differs from $2R_R$ by an amount on the order of or less than one tenth of the diameter $2R_R$ of the Rowland circle. The spherically bent diffraction crystal 10 may be employed, for example, to provide an improved point focusing X-ray monochromator for use in an X-ray spectrometer or an ESCA system for studying the chemical composition of a selected sample. X-ray spectrometers of the type in which such a point focusing X-ray monochromator may be used to advantage are well known. For example, see FIG. 1 of U.S. Pat No. 3,321,624 issued on May 23, 1967, to Seigo Kishino et al. ESCA systems of the type in which such a point focusing X-ray monochromator may be used to advantage are shown and described on pages 171–173 of the book ESCA, ATOMIC, MOLECULAR AND SOLID STATE STRUCTURE STUDIED BY MEANS OF ELECTRON SPECTROSCOPY (hereinafter referred to as the book ESCA) written by Kai Siegbahn et al and published in December, 1967, by Almqvist and Wicksells Boktryckeri AB and in U.S. Pat. No. 3,617,741 entitled ELECTRON SPECTROSCOPY SYSTEM WITH A MULTIPLE ELECTRODE ELECTRON LENS, and issued on Nov. 2, 1971, to Kai M. B. Siegbahn et al.

As indicated in FIG. 4, the improved point focusing X-ray monochromator is provided by employing an X-ray source 22 (comprising an active X-radiating element and/or a passive defining slit) mounted for directing a characteristic X-ray line toward the spherically bent diffraction crystal 10 where the angle $\theta$ satisfies the condition for Bragg diffraction. This condition is $2d \sin\theta = n\lambda$, where $d$ is the lattice spacing of the quartz disc 10 in the Y direction, $\theta$ is the Bragg angle (the angle between the central ray of the characteristic X-ray line impinging on the crystal monochromator and a tangent to the Rowland circle at the point of incidence of the central ray), n is the order of diffraction, and $\lambda$ is the wavelength of the characteristic X-ray line. For an AlK$\alpha$ X-ray source 22 of E = 1.487Kev ($\lambda$ = 8.3205A) and a spherically bent diffraction crystal 10 with the structure and dimensions set forth above, the Bragg angle $\theta$ is 78.46° for first order diffraction (n = 1). The spherically bent diffraction crystal 10 monochromatically focuses the characteristic X-ray line on the Rowland circle at a conjugate of the point from which the characteristic X-ray line is directed toward the spherically bent diffraction crystal. A target 24 is mounted at the focal point of the spherically bent diffraction crystal 10. In the case of an X-ray spectrometer the target comprises a detector (for example, a defining slit and/or a photographic plate) since the X-ray source 22 comprises the sample under study. However, in the case of an ESCA system, the target 24 comprises the sample under study and/or a defining slit. Irradiation of the sample 24 by the characteristic X-ray line causes the sample to emit photoelectrons. An electron spectrometer such as one of those disclosed in the book ESCA or U. S. Pat. No. 3,617,741 mentioned above is employed for analyzing this photoelectron emission to determine the chemical composition of the sample 24.

The lack of conformity of the curved surface 12 of the spherically bent diffraction crystal 10 to the Rowland circle of the monochromator produces a geometrical aberration. If the diffraction crystal 10 were stress free, this geometrical aberration would, in the plane of the Rowland circle of the monochromator, cause the X-rays reflected from the edges of the curved surface 12 of the diffraction crystal to be shifted towards lower Bragg angles relative to the X-rays reflected from the center of the curved surface 12 of the diffraction crystal. This is represented by the dashed rays in FIG. 4. As shown in FIG. 5, the contribution of the above-mentioned geometrical aberration to the line width of the X-radiation focused by a spherically bent diffraction crystal 10 with the dimensions set forth above would then be about $\Delta E = 0.15$ev.

Figure 6:
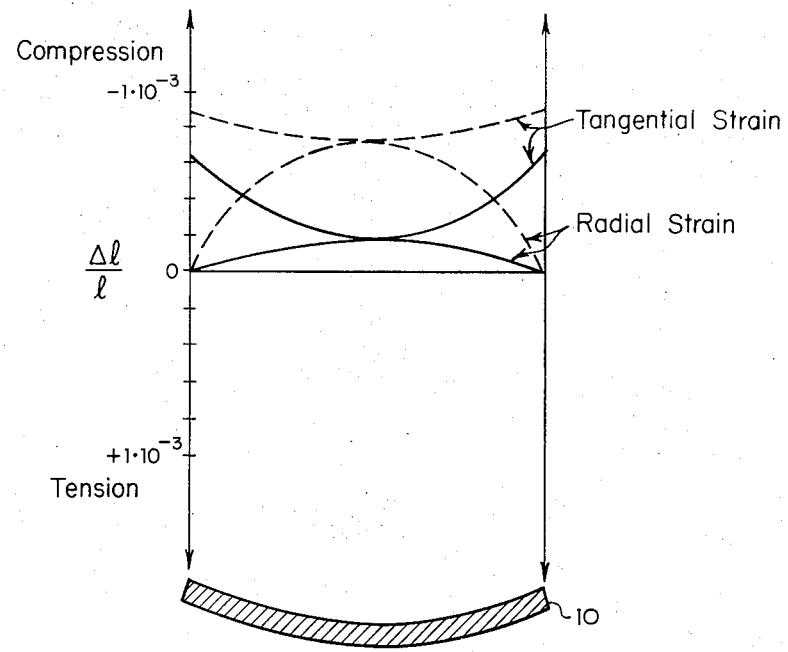
FIG. 6 is a plot of the radial and tangential strain distribution, $\Delta l/l$, across the curved surface of the spherically bent diffraction crystal of FIGS. 1-4 for two different thicknesses of the spherically bent diffraction crystal.
Figure 7:
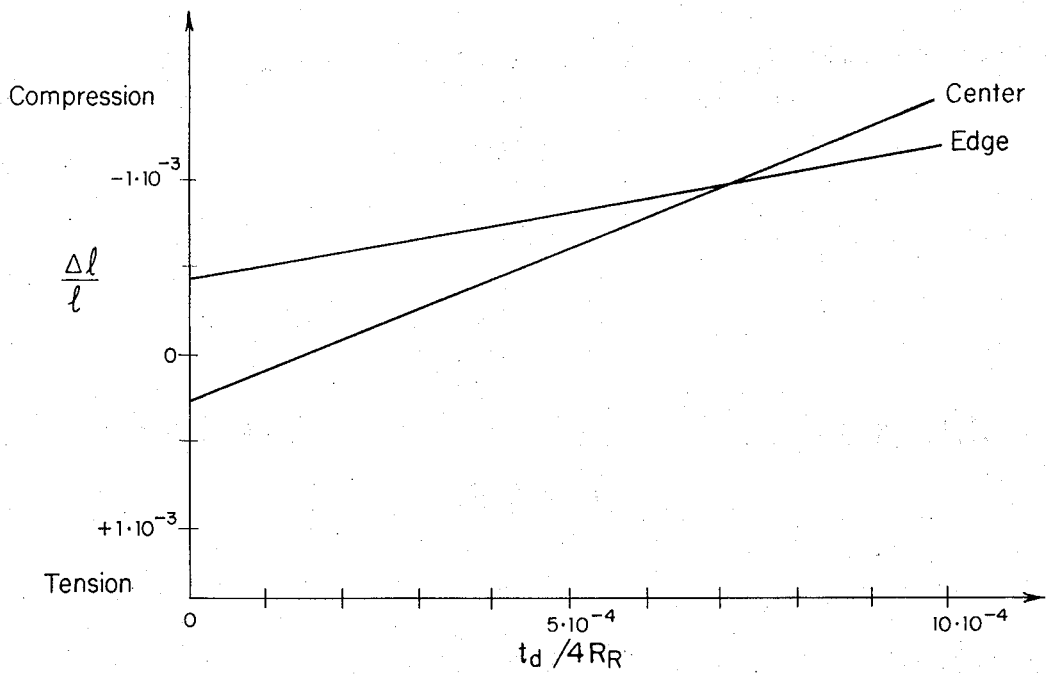
FIG. 7 is a plot of the radial and tangetial strain, $\Delta l/l$, at the center and the tangential strain, $\Delta l/l$, at the edge of the curved surface of the spherically bent diffraction crystal of FIGS. 1-4 as a function of the ratio of the thickness, $t_d$, to the diameter of curvature, $4R_R$, of the curved surface of the spherically bent diffraction crystal.
Figure 8:
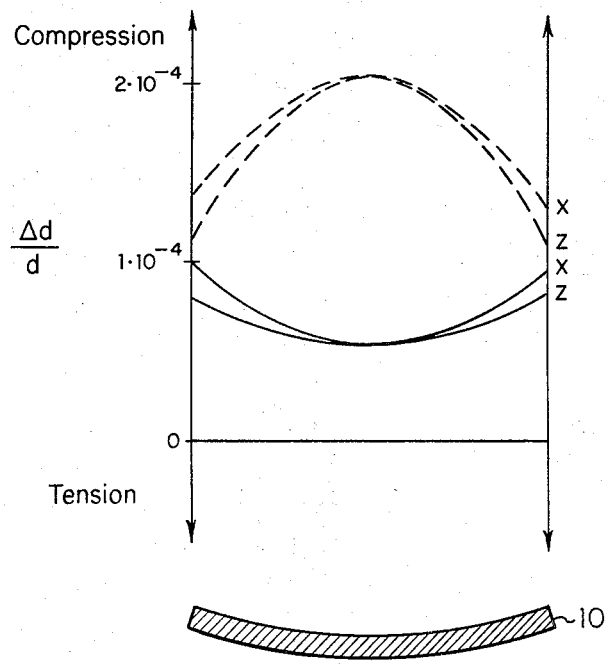
FIG. 8 is a plot of the change in lattice spacing in the Y direction, $\Delta d/d$, as a function of the position in the X and Z directions across the curved surface of the spherically bent diffraction crystal of FIGS. 1-4 for two different thicknesses, $t_d$, of the spherically bent diffraction crystal.
Figure 9:
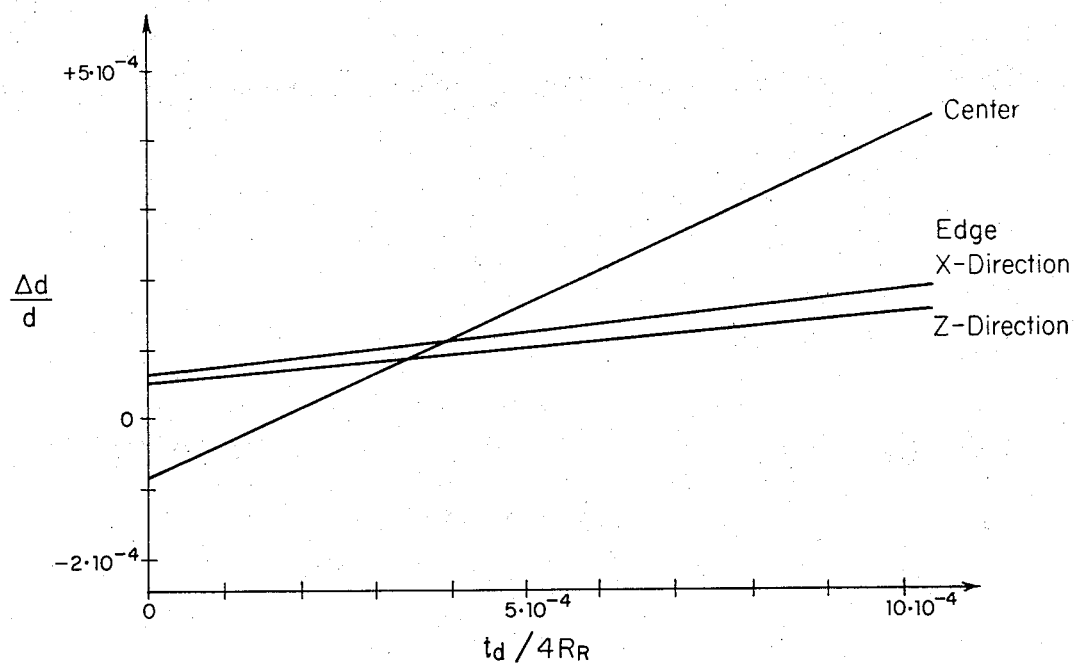
FIG. 9 is a plot of the change in lattice spacing in the Y direction, $\Delta d/d$, taken at the center and also taken for the X and Z directions at the edge of the curved surface of the spherically bent diffraction crystal of FIGS. 1-4 as a function of the ratio of the thickness, $t_d$, to the diameter of curvature, $4R_R$, of the curved surface of the spherically bent diffraction crystal.
Figure 10:
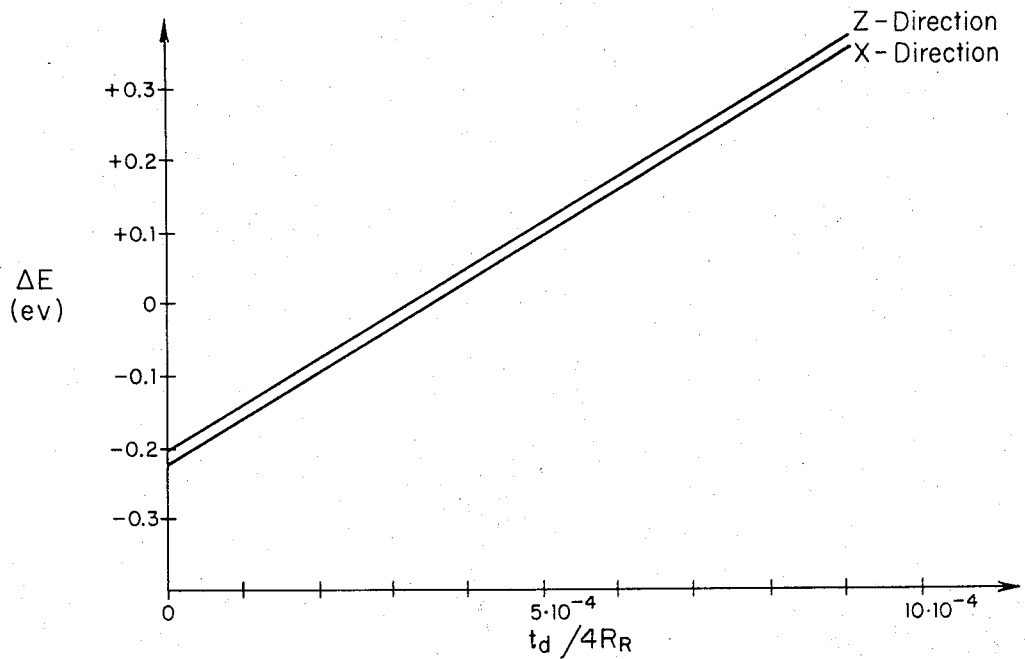
FIG. 10 is a plot showing how the energy dispersion in the X and Z directions at the curved surface of the spherically bent diffraction crystal of FIGS. 1-4 due to the difference in the bending strain between the center and edge of the spherically bent diffraction crystal varies as a function of the ratio of the thickness, $t_d$, to the diameter of curvature, $4R_R$, of the curved surface of the spherically bent diffraction crystal for constant Bragg angle and for Al $K\alpha$ X-rays.

Bending the diffraction crystal 10 causes it to have a nonuniform strain distribution and, hence, a variation in lattice spacing throughout the diffraction crystal. The radial and tangential strain distribution $\Delta 1/1$ across the curved surface 12 of the diffraction crystal 10 and the variation of lattice spacing in the Y direction $\Delta d/d$ as a function of position in the X and Z directions across the curved surface 12 of the diffraction crystal 10 are represented in FIGS. 6 and 8, respectively, by solid lines for a diffraction crystal 10 with a thickness, $t_d$, of 0.006 inch and by dashed lines for a diffraction crystal 10 with a thickness, $t_d$, of 0.013 inch. Similarly, the variation of the radial and tangential strain distribution at the center and of the tangential strain distribution at the edge of the curved surface 12 of the diffraction crystal 10 and the variation of the lattice spacing in the Y direction $\Delta d/d$ at the center and for the X and Z directions at the edge of the curved surface 12 of the diffraction crystal 10 are represented in FIGS. 7 and 9, respectively, as a function of the ratio of the thickness, $t_d$, of the diffraction crystal 10 to the diameter of curvature, $4R_R$, of the curved surface 12 of the diffraction crystal 10. The variation of the lattice spacing in the Y direction across the curved surface 12 of the diffraction crystal 10 gives rise to a significant aberration. This strain aberration is opposite in sign from the above-mentioned geometrical aberration for values of $t_d/4R_R$ greater than about $3.5 \times 10^{-4}$ and, in the plane of the Rowland circle of the monochromator, therefore shifts the X-rays reflected from the center of the curved surface 12 of the diffraction crystal 10 towards lower Bragg angles closer or equal to those of the X-rays reflected from the edge of the curved surface 12 of the diffraction crystal 10. This is represented by the solid rays in FIG. 4. The variation of the energy dispersion $\Delta E$ caused in the X and Z directions at the curved surface 12 of the diffraction crystal 10 by this strain aberration is plotted in FIG. 10 as a function of the ratio of the thickness, $t_d$, of the diffraction crystal 10 of the diameter of curvature, $4R_R$, of the curved surface 12 of the diffraction crystal 10. From inspection of FIGS. 5 and 10, it may be seen that this strain aberration and the abovementioned geometrical aberration may be made to cancel by properly choosing the thickness, $t_d$, and the diameter, $D_d$, of the diffraction crystal 10 and the radius of curvature $2R_R$ of the curved surface 12 of the diffraction crystal 10. Due to the anisotropy of many diffraction crystals 10, this strain aberration and, hence, the lattice spacing in the Y direction $\Delta d/d$ and the energy dispersion $\Delta E$ caused by this strain aberration differ slightly in the X and Z directions as shown in FIGS. 8–10.

We claim:

1. A bent diffraction crystal having a curved surface with a radius of curvature substantially equal to the diameter of the Rowland circle in the plane of the Rowland circle, having a geometrical aberration caused by the lack of conformity of the curved surface to the Rowland circle in the plane of the Rowland circle, and having a strain aberration opposite in sign from this geometrical aberration, the thickness of the diffraction crystal and the radius of curvature of the curved surface of the diffraction crystal being adjusted so that the strain aberration compensates for the geometrical aberration.

2. A bent diffraction crystal as in claim 1 wherein the curved surface is spherically bent with a radius of curvature substantially equal to the diameter of the Rowland circle in the plane of the Rowland circle.

3. A bent diffraction crystal as in claim 2 wherein said thickness, said radius of curvature, and the diameter of the diffraction crystal are adjusted so that said strain aberration compensates for said geometrical aberration.

4. A bent diffraction crystal as in claim 3 wherein the diffraction crystal is bonded in place upon a spherically curved surface of a substrate.

5. A bent diffraction crystal as in claim 4 wherein the curved surface and the atomic planes of the diffraction crystal are concentrically spherically bent with a radius of curvature substantially equal to the diameter of the Rowland circle.

6. A bent diffraction crystal as in claim 5 wherein the diffraction crystal is made from y-cut quartz and the substrate is made from x-cut quartz and wherein the Z axes of the y-cut quartz diffraction crystal and of the x-cut quartz substrate are aligned within less than 30°.

7. A method of fabricating a diffraction crystal, said method comprising the steps of bending a crystalline diffracting element to provide it with a curved surface having a radius of curvature substantially equal to the diameter of a Rowland circle, nd adjusting the thickness of the crystalline diffracting element to provide it with a strain aberration which compensates for a geometrical aberration caused by the lack of conformity of the curved surface to the Rowland circle in the plane of the Rowland circle.

8. A method as in claim 7 wherein the step of bending the crystalline diffracting element comprises forcing it into continuous abutment upon a spherically curved surface of a substrate by applying uniform pressure to the crystalline diffracting element and then bonding the crystalline diffracting element in place on the spherically curved surface of the substrate.

* * * * *